Feb. 24, 1970     D. V. MANFREDI     3,496,683
METHOD OF MANUFACTURE OF CONTOURED FACE SEALS
Filed Feb. 10, 1967     4 Sheets-Sheet 1
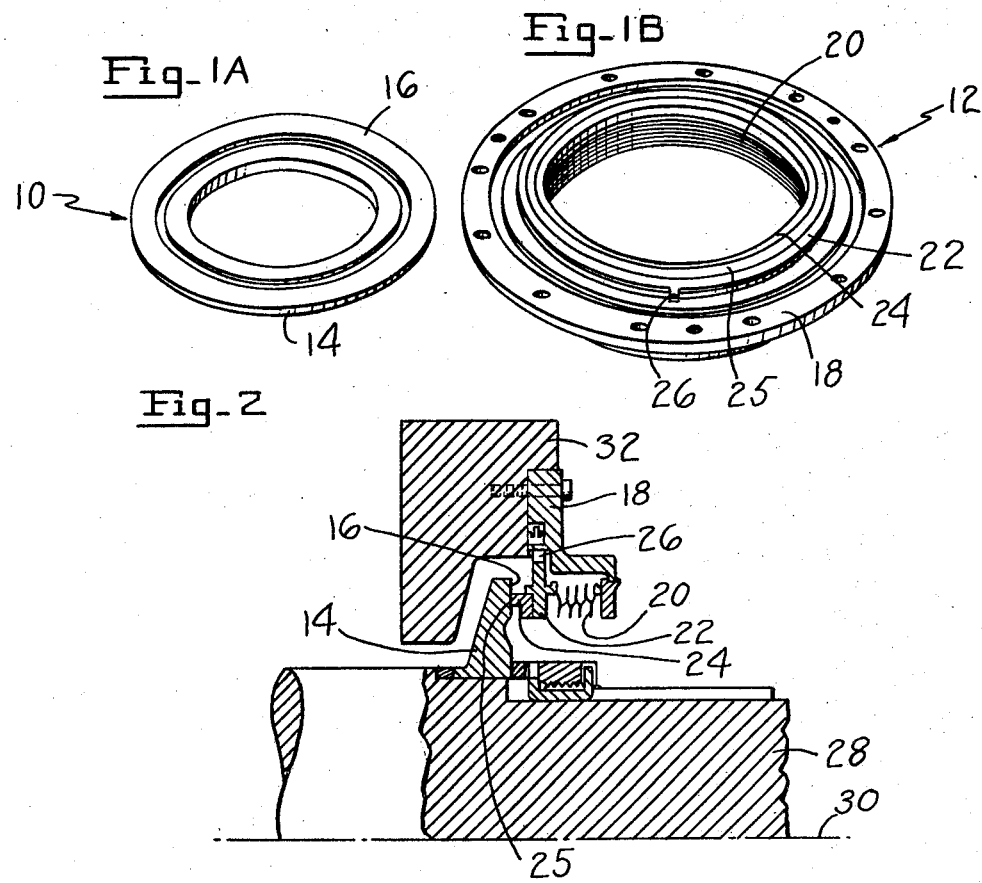
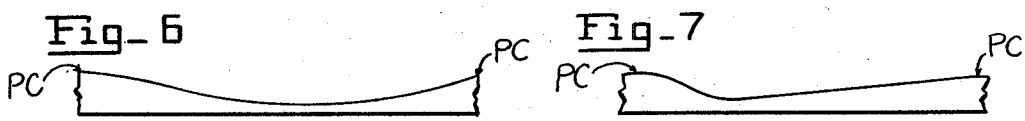
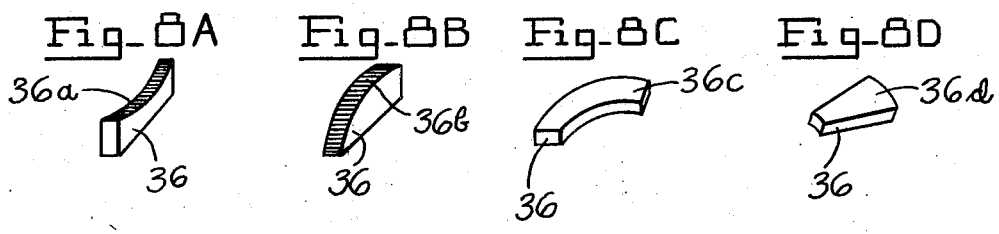
INVENTOR.
DANIEL V. MANFREDI
BY
ATTORNEYS

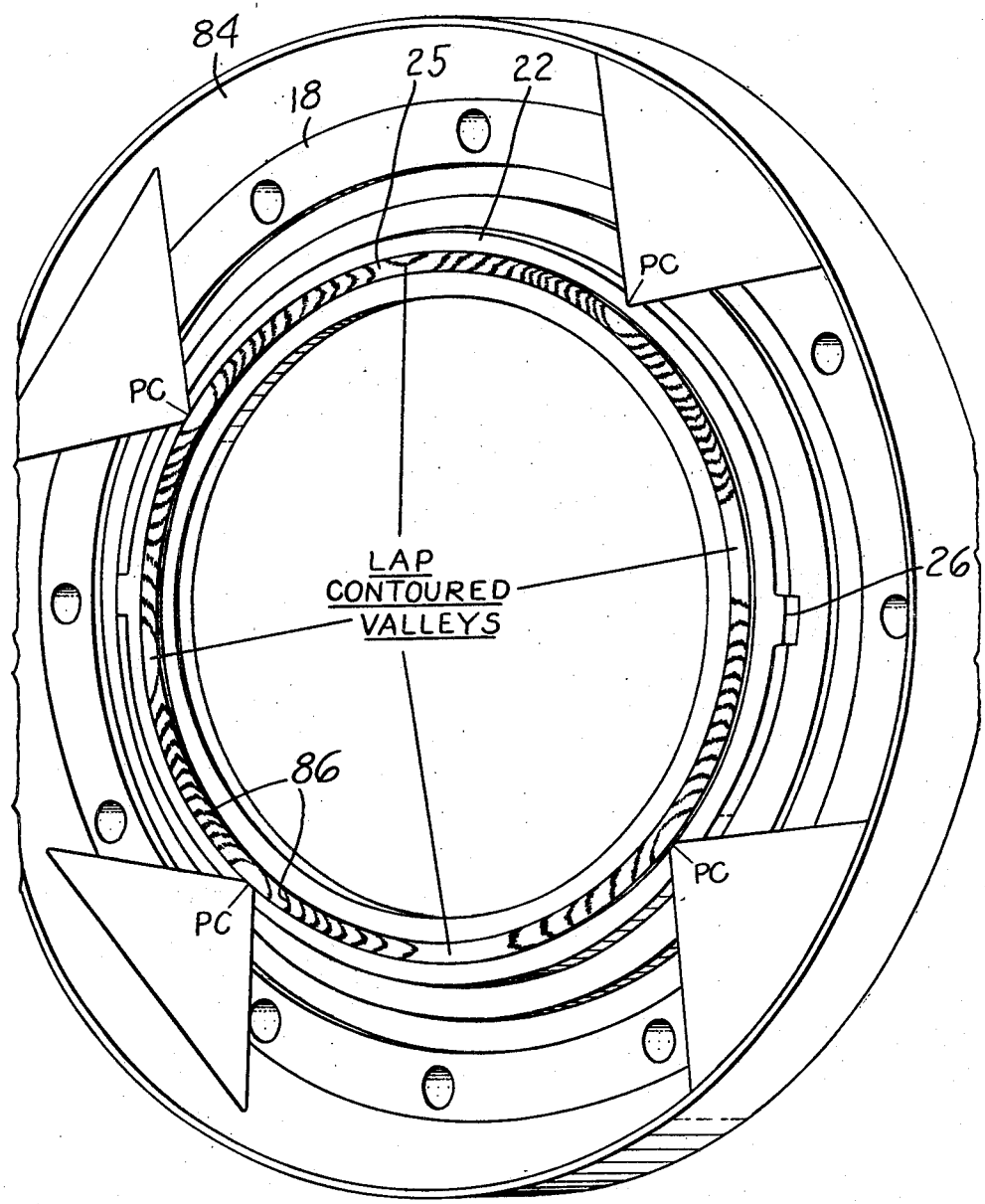

Feb. 24, 1970     D. V. MANFREDI     3,496,683

METHOD OF MANUFACTURE OF CONTOURED FACE SEALS

Filed Feb. 10, 1967     4 Sheets-Sheet 3

Feb. 24, 1970     D. V. MANFREDI     3,496,683
METHOD OF MANUFACTURE OF CONTOURED FACE SEALS
Filed Feb. 10, 1967     4 Sheets-Sheet 4

United States Patent Office 3,496,683
Patented Feb. 24, 1970

3,496,683
METHOD OF MANUFACTURE OF CONTOURED FACE SEALS
Daniel V. Manfredi, Middletown, Conn., assignor to United Aircraft Corporation, East Hartford, Conn., a corporation of Delaware
Filed Feb. 10, 1967, Ser. No. 615,216
Int. Cl. B24b 1/00
U.S. Cl. 51—326                                                8 Claims

ABSTRACT OF THE DISCLOSURE

A method of fabrication of liquid or gas rotating face seal apparatus wherein either the stationary element or the rotating element of a rotating face seal is provided with a predetermined lapped contour of valleys and peaks for improved sealing characteristics.

BACKGROUND OF THE INVENTION

Field of the invention

This invention relates to rotating face seals and the method of manufacture thereof. More particularly, this invention relates to the method of manufacture of rotating face seals having a contoured sealing surface and being suitable for use in either liquid or gas environments.

Description of the prior art

It has heretofore been assumed that for a rotating face seal to have extremely low leakage the seal rubbing face must have a minimum of at least a single line of continuous contact completely around the sealing face. To provide this continuous contact, it has heretofore been further assumed that the best obtainable flatness and finish is required to accomplish or approach optimum sealing conditions. However, notwithstanding the present ability to achieve very high degrees of flatness and finish, the effectiveness of rotating face seals has continued to be a significant problem, and this problem has been particularly acute in situations where elements which were initially of a required degree of flatness and finish for a particular sealing requirement adhere to each other or become worn or otherwise distorted. That is, the higher the initial degree of flatness and finish possessed by the sealing elements, the more acute is the problem of achieving proper motion between them and the greater is the impact of wear and other distortions on the sealing capabilities of the elements. Thus it has been determined that a controlled departure from absolute flatness leads to an improved and highly effective rotating seal configuration.

Summary of the invention

The face seal apparatus fabricated in accordance with the present invention has a plurality of accurately controlled shallow surface contours forming waves or valleys with depths on the order of from one to approximately twenty helium light bands (1 helium light band=$11.6 \times 10^{-6}$ inches)

The contoured surfaces are created in one of the rubbing surfaces of the rotating face seal structure. Significant improvement in gas face seals is realized with the contoured rubbing surface structure of the present invention with a waviness or valley depth on the order of approximately 10–12 helium light bands with a period of, for example, four waves around the entire sealing surface. Test results have shown improved seal performance in reduced wear, lower operating temperatures, low leakage, more stable operation, and improved seal reliability. Oil face seals with contoured rubbing surfaces having a waviness or valley depth on the order of 1–2 helium light bands and with a period of, for example, four waves around the seal surface also have shown improved seal performance in reduced wear, low leakage, stable operation, and higher reliability.

The process of the present invention in producing the contoured sealing surface for rotating face seals of the present invention includes the following steps:

(1) The rotor and stator elements of the face seal are lapped to less than 1 helium light band flatness and to approximately 1 micro-inch arithmetic average finish.

(2) One of the rotor or stator elements, preferably the stator element, is placed on lapping bars, the number of lapping bars being equal to the number of valleys or waves it is desired to produce.

(3) Pressure and motion are then applied which are common at each point of contact between the surface being contoured and the lapping bars to provide the desired contour. The span of the motion is usually varied during the lapping process to provide the desired contouring, and the maximum dimension of the lapping span is preferably limited only to the extent necessary to avoid overlapping between adjacent valleys.

DESCRIPTION OF THE DRAWINGS

In the drawings, wherein like elements are numbered alike in the several figures:

FIGURE 1A is a perspective view of a rotor element for a face seal produced in accordance with the present invention.

FIGURE 1B is a perspective view of a stator element for a face seal produced in accordance with the present invention.

FIGURE 2 is a one-half elevation view, partially in section, of a rotating face seal assembly produced in accordance with the present invention.

FIGURE 3 is a perspective view of a face seal stator produced in accordance with the present invention viewed through an optical flat.

FIGURE 6 is an enlarged view of a symmetrical valley or wave in a face seal rubbing member in accordance with the present invention.

FIGURE 7 is an enlarged view of a nonsymmetrical valley or wave in a face seal rubbing member in accordance with the present invention.

FIGURES 8A, 8B, 8C and 8D are perspective showings of alternative types of lapping bars for producing various sealing member contours for the present invention.

DESCRIPTION OF THE PREFERRED EMBODIMENTS

Figure 4A:
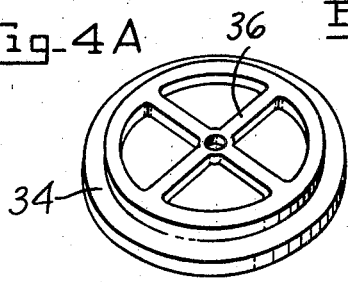
FIGURES 4A, 4B, 4C, 4D and 4E show various types of lapping elements for use in producing the contoured seal of the present invention.

Referring now to FIGURES 1A and 1B, a rotating face seal rotor unit 10 is shown in FIGURE 1A, and a mating face seal stator unit 12 is shown in FIGURE 1B. Rotor unit 10 is comprised of a ring 14 having an annular rubbing seal surface 16. Stator unit 12 has a ring body 18, and a bellows 20 is connected at one end to ring 18. The other end of bellows 20 is connected to and supports retainer ring 22, and retainer ring 22 houses an annular nose piece or rubbing seal surface 24 which may be either brazed or shrink-fitted to an annular recess in retainer ring 22. The upper surface of nose piece 24 forms the rubbing seal surface 25 of stator unit 12 and is sized to face butt against rubbing seal surface 16 of rotor unit 10. One or more torque tabs 26 may extend from retainer ring 22 to ring body 18 to lock retainer ring 22 and nose piece 24 against rotation relative to ring body 18.

Referring now to FIGURE 2, the seal elements of FIGURES 1A and 1B are shown mounted for mating contact. Rotor unit ring 14 is mounted, such as by clamping, brazing or a shrink-fit, to a shaft 28 having an axis 30. Ring body 18 is connected, by any convenient means such as bolting, to a stationary support element 32, and the relationship between ring body 18, bellows 20, retaining ring 22 and nose piece 24 can clearly be seen in FIGURE 2. FIGURE 2 also clearly shows the butting contact between rubbing seal surface 16 of rotor unit 10 and rubbing seal surface 25 of stator unit 12. It will, of course, be understood that the rotor and stator structure shown in FIGURE 2 is annular about shaft axis 30.

In accordance with the teachings of the present invention, either rubbing seal surface 16 of rotor 10 or rubbing seal surface 25 of stator 12, preferably stator rubbing seal surface 25, is contoured by lapping to have a predetermined series of valleys or waves therein around the rubbing surface to form a surface of preconditioned contour while the other rubbing seal surface, preferably rubbing seal surface 16, is lapped to an extremely precise flatness. The following discussion will proceed on the assumption that the preconditioned contouring is performed in rubbing seal surface 25, but it will also be understood that the contouring could be accomplished in rotor rubbing seal surface 16 if desired. Testing has shown that the contouring of stator rubbing seal surface 25, in conjunction with an extremely precise flatness of rotor rubbing seal surface 16, provides a significantly improved rotating face seal assembly.

Figure 4C:
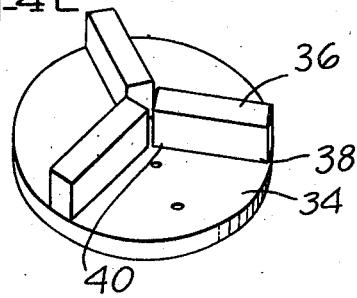
Figure 4B:
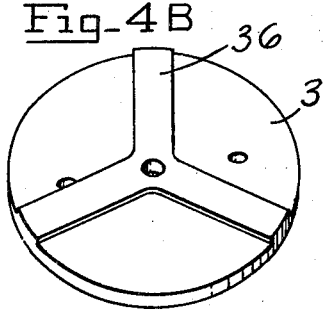
Figure 4D:
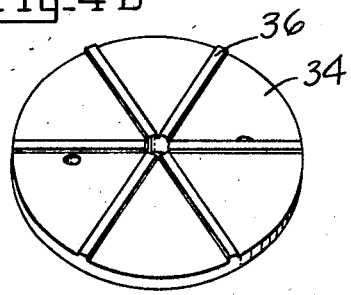
Figure 4E:
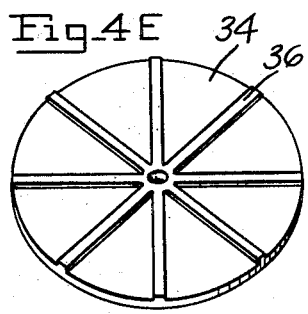

Referring now to FIGURES 4A–4E, several different lapping plates are shown for accomplishing different lapping patterns. FIGURE 4A shows a lapping plate 34 with four lapping bars 36 for generating a four-valley contour around rubbing seal surface 25. FIGURE 4B shows a lapping plate 34 having three lapping bars 36 for generating a three-valley contour around rubbing seal surface 25. FIGURE 4C shows another arrangement of three lapping bars 36 on a lapping plate 34 for generating a three-valley contour in rubbing seal surface 25. It will be noted that the lapping bars 36 in FIGURES 4A and 4B are integral with the lapping plates whereas the lapping bars 36 in FIGURE 4C are shown as separate elements which are secured to plate 34 in a known fashion. In the arrangement of FIGURE 4C, the angular relationship between the bars 36 and plate 34 can be varied by raising either the outer end 38 or the inner end 40 of the lapping bars to vary the contours of the valleys to be generated. FIGURES 4D and 4E show, respectively a six-lapping bar arrangement and an eight-lapping bar arrangement for producing a six-valley contour and an eight-valley contour, respectively, in rubbing seal surface 25.

Figure 5:
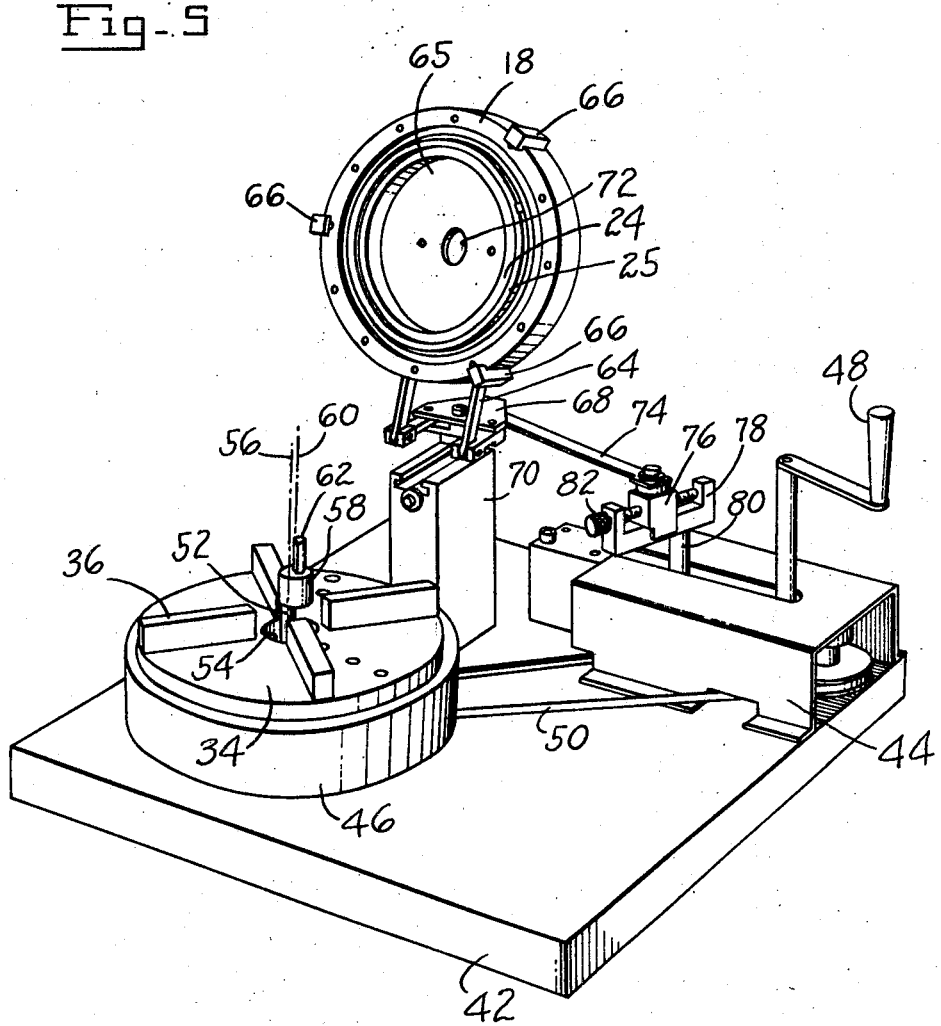
FIGURE 5 is a perspective view of a face seal contour lapping fixture for use in the present invention.

Referring now to FIGURE 5, a contour lapping fixture is shown for producing the contoured face seal structure of the present invention. The rig shown in FIGURE 5 includes a base plate 42 on which are mounted a drive block 44 and a lapping plate support block 46 of annular shape and having a circular central opening. A drive crank 48, which may be manually operated or motor driven, drives through a belt 50, and belt 50 is connected to drive a shaft 52 mounted on base place 42 within the circular opening of support block 46. A lapping plate 34 is positioned on lapping plate support block 46 and is secured by any suitable means against movement relative to support block 46. Shaft 52 passes through a central opening 54 in lapping plate 34, and it will be noted that all the lapping plates shown in FIGURES 4A–4E are provided with such central openings. Shaft 52 has a shaft axis 56 about which it rotates, and an eccentric 58 is mounted on shaft 52 for rotation with shaft 52, eccentric 58 having an axis 60 displaced from axis 56. An extension or finger 62 extends from eccentric 58 and is used as a driving element to produce eccentric motion relative to lapping plate 34.

The lapping plate shown in the FIGURE 5 rig has four lapping bars 36 for use in producing a four-valley contour in a face seal rubbing element. The four lapping bars in FIGURE 5 are shown as being of the type described in FIGURE 4C in that the angular relationship between the lapping bars 36 and lapping plate 34 can be changed if desired to vary the shape of the valleys generated in the face seal rubbing member to be contoured.

A stator ring body 18 with nose piece 24 fixed therein is secured to a yoke 64 by a retainer plate 65 connected to yoke 64 and by three retainer elements 66 extending from plate 65. Yoke 64 is pivotably connected to an oscillator platform 68 which is pivotably mounted on a support block 70. Yoke 64 pivots counterclockwise from the position shown in FIGURE 5 to bring rubbing seal surface 25 and nose piece 24 into flat and flush contact with the four lapping bars 36, and finger 62 on eccentric 58 then passes through and contacts the wall of a central opening 72 in plate 65. Oscillator platform 68 is connected by an arm 74 to an oscillator control element having a movable block 76. Arm 74 is pivotably connected at one end to oscillator platform 68, and the other end of arm 74 is pivotably connected to block 76. Block 76 is mounted on a carriage 78, and carriage 78 is connected to a rotatable shaft 80, the connection of carriage 78 to shaft 80 being at a point on carriage 78 removed from the center of carriage 78. The position of block 76 can be adjusted with respect to carriage 78 by an adjusting screw 82 so that the distance from the block 76 to the axis of shaft 80 can be varied.

Prior to the operation of the rig of FIGURE 5, rubbing seal surface 25, the upper surface of lapping plate 34, and the lapping surfaces of bars 36 are each lapped flat to less than 1 helium light band, the finish of rubbing surface 25 also being less than $1 \times 10^{-6}$ inches arithmetic average. A fine lapping compound such as a fine diamond microlap compound is applied to the upper surface of the lapping bars, and yoke 64 is then rotated counterclockwise to bring rubbing seal surface 25 into flat contact with the upper surfaces of the lapping bars. Crank 48 is then turned to drive shaft 52 and thus rotate eccentric 58. Finger 62 contacts the wall of central opening 72 and thus causes an oscillatory movement of rubbing seal surface 25 against the lapping bars at the points of contact between the rubbing seal surface and the lapping bars.

With the lapping rig shown in FIGURE 5, oscillator platform 68 oscillates in a plane parallel to base plate 42, and the oscillatory motion is transmitted through arm 74 to cause rotation of carriage 78 and shaft 80 about the axis of shaft 80. The arrangement of elements as shown in FIGURE 5 causes rubbing seal surface 25 to move generally in a figure 8 loop with respect to lapping bars 36 to produce a multidirectional motion for rubbing seal surface 25. The setting of adjustment screw 82 is then gradually altered to move block 76 toward the axis of rotation of carriage 78 to thus reduce the span of the motion of rubbing seal surface 25 with respect to lapping bars 36. It should be borne in mind that the dimension of the span of the lap produced by any one lapping bar should be the maximum allowable without overlapping the span of any other lapping bar. As the span of the motion of rubbing seal surface 25 with respect to the lapping bars is decreased, the pressure between the rubbing seal surface and the lapping bars and/or the time of contact therebetween is increased to produce contoured valleys in rubbing seal surface 25 having an increasing depth from the outer extremes of the span of the valley toward the center of the valley.

Although the creation of the contoured valleys has been described above with respect to the particular motion of the rig of FIGURE 5, it will be understood that the basic concept of concern within the scope of the present invention is that any motion such as circular or spiral can be employed to produce relative rubbing action between rubbing seal surface 25 and the lapping bars to produce a diminishing rubbing span therebetween for lapping action. The lapping can be accomplished by rigs other than that shown in FIGURE 5 or by hand. The maximum depth of the valleys to be produced in rubbing seal surface 25 may vary from approximately 1 helium light band to approximately 20 helium light bands depending on the environment in which the rotating face seal is to be operated. The required depth of the valley is a function of the fluid to be sealed taking into consideration the amount of lift obtainable from the fluid and the amount of leakage that can be tolerated in the system. Thus, a shallow valley can be employed for sealing viscous materials such as oil and deeper valleys can be employed for sealing less viscous materials such as gas.

For a rotating face seal in an oil environment, a configuration of four valleys equally spaced around rubbing seal surface 25 and each having a maximum depth of from 1–2 helium light bands has been found to be a particularly effective seal when mated with a rotor element having a rubbing seal surface 16 of a flatness of not more than 2 helium light bands after having been assembled to its shaft. A nose piece 24 and rotor 10 both of tungsten carbide have been found to produce a particularly suitable oil seal. Similarly, a configuration having four valleys equally spaced around rubbing seal surface 25 and each having a depth of from 10–12 helium light bands has been found to be a particularly effective rotating face seal arrangement for a gas environment when mated with a rotor unit 10 having a rubbing seal surface 16 of a flatness of not more than 2 helium light bands after assembled to its shaft. A nose piece 24 of titanium carbide and a rotor 10 of tungsten carbide have been found to produce a particularly suitable gas seal.

Referring now to FIGURE 3, a perspective view is shown of a lapped rubbing seal surface 25 in accordance with the present invention. The stator unit is viewed through an optical flat 84 under illumination with a helium light source. The triangular elements labelled PC indicate points of contact between the optical flat and the four peaks or high points of the four-valley contoured configuration. When illuminated with a helium light source through the optical flat, sets of bands 86 appear on surface 25 with the bands having centers at the points of contact and the separations between the bands being equal to one wave length of helium light. The bands, in effect, form a contour map showing changes in the depth of the valley between any two points of contact. The valleys between the points of contact are labelled as shown in FIGURE 3 with the indicating lines pointing to the point of maximum depth in each valley.

Referring now to FIGURE 6, a partial elevation view on an enlarged scale is shown of a typical valley in rubbing seal surface 25. The valley shown in FIGURE 6 extends between two high points (labelled PC to indicate the points where contact will be made with an optical flat as in the FIGURE 3 showing), and the valley of FIGURE 6 is symmetric about the low point between the two points of contact.

Referring now to FIGURE 7, another possible contour for a valley in rubbing seal surface 25 is shown. The valley shown in FIGURE 7 is non-symmetric between the two high points (labelled PC) for improved lifting characteristics. The non-symmetric contour of FIGURE 7 can be generated by a gradual shifting of the center of motion of the rubbing during the lapping operation.

In some environments, it may be desirable to have more complicated contour surfaces for the valleys than the simple symmetric surface shown in FIGURE 6 or the relatively simple non-symmetric surface shown in FIGURE 7. A variety of three-dimensional surfaces can be created by proper selection of the shape of the lapping bar surfaces.

Lapping bars having curved lapping surfaces such as the surfaces 33a and 36b shown in FIGURES 8A and 8B, respectively, can also be employed to produce desired warpings of the contoured valley surfaces. Lap bars of the type shown in FIGURE 8A and FIGURE 8B would preferably be employed in sets of three to assure continuous contact between the lapping bars and the rubbing seal surface being lapped.

FIGURES 8C and 8D show lapping bars 36 having lapping surfaces 36c and 36d shaped such that the surface to be lapped will be contacted by different amounts of lapping surface as the lapping bar is moved across the surface to be lapped. Thus, lapping bars such as those of the shape shown in FIGURES 8C and 8D can be employed to produce nonsymmetric contours of the type shown in FIGURE 7.

While preferred embodiments have been shown and described, various modifications and substitutions may be made without departing from the spirit and scope of this invention. Accordingly, it is to be understood that this invention has been described by way of illustration rather than limitation.

What is claimed is:
1. The method of forming a face seal for sealing a liquid wherein the seal has a rotor element with a rubbing seal surface and a stator element with a rubbing seal surface, including the steps of:
   lapping the rubbing seal surface of both said rotor element and said stator element to a predetermined flatness, and
   lapping the rubbing seal surface to one of said rotor and stator elements to form a preconditioned contoured surface therein.
2. The method of forming a face seal as in claim 1 wherein:
   said one element is said stator element.
3. The method of forming a face seal as in claim 2 wherein:
   the flatness of said rotor element is 1 to 2 helium light band; and wherein
   said preconditioned contoured surface is a series of valleys having a maximum depth of from 1 to 20 helium light bands.
4. The method of claim 1 wherein the step of lapping a rubbing seal surface to form a preconditioned contoured surface comprises:
   producing a relative rubbing action between the rubbing seal surface and a plurality of lapping bars; and
   diminishing the rubbing span while continuing the relative rubbing action.
5. The process of claim 4 wherein said step of producing relative rubbing action comprises:
   causing nonoverlapping oscillatory motion between the rubbing seal surface and the lapping bars.
6. The process of claim 5 wherein the rubbing seal surfaces are lapped to a predetermined flatness of 1 to 2 helium light bands; and wherein
   said preconditioned contoured surface is a series of valleys having a maximum depth of from 1 to 20 helium light bands.
7. The process of claim 6 wherein the preconditioned contoured surface is formed on the stator element.
8. The process of claim 1 wherein the step of lapping a rubbing seal surface to form a preconditioned contoured surface comprises:
   causing nonoverlapping oscillatory motion between said seal surface and a plurality of lapping bars.

References Cited

UNITED STATES PATENTS 2,136,036   11/1938   Avery _____ 51—281

LESTER M. SWINGLE, Primary Examiner